US012664032B2

(12) United States Patent　　(10) Patent No.:　US 12,664,032 B2

Malvankar et al.　　(45) Date of Patent:　Jun. 23, 2026

(54) SYSTEM AND METHOD TO DYNAMICALLY ADD NODES TO A CONTAINER MANAGEMENT SYSTEM CLUSTER FOR AI WORKLOADS

(71) Applicant: INTERNATIONAL BUSINESS MACHINES CORPORATION, Armonk, NY (US)

(72) Inventors: Abhishek Malvankar, White Plains, NY (US); Alaa S. Youssef, Valhalla, NY (US); Diana Jeanne Arroyo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 18/329,556

(22) Filed: Jun. 5, 2023

(65) Prior Publication Data

US 2024/0403143 A1　　Dec. 5, 2024

(51) Int. Cl.
　　*G06F 3/00*　　(2006.01)
　　*G06F 9/48*　　(2006.01)
　　*G06F 9/54*　　(2006.01)
(52) U.S. Cl.
　　CPC ............. *G06F 9/54* (2013.01); *G06F 9/4881* (2013.01)
(58) Field of Classification Search
　　CPC ....................................................... G06F 9/48
　　See application file for complete search history.

(56) References Cited

U.S. PATENT DOCUMENTS

| | | | |
|---|---|---|---|
| 7,870,234 B2 | 1/2011 | Arendt | |
| 9,280,390 B2 | 3/2016 | Sirota | |
| 9,384,571 B1 * | 7/2016 | Covell | G06Q 10/10 |
| 10,554,574 B2 * | 2/2020 | Bhandaru | H04L 41/5054 |
| 10,721,141 B1 * | 7/2020 | Verma | H04L 41/0894 |
| 10,997,538 B1 * | 5/2021 | Chandrachood | |
| | | | G06Q 10/06312 |
| 2006/0123428 A1 * | 6/2006 | Burns | G06F 21/34 |
| | | | 719/318 |
| 2010/0077300 A1 * | 3/2010 | Dugan | G06F 16/9562 |
| | | | 715/273 |

(Continued)

FOREIGN PATENT DOCUMENTS

| | | | | |
|---|---|---|---|---|
| CN | 111124765 A | * | 5/2020 | G06F 9/4806 |
| CN | 106170782 B | | 8/2020 | |

OTHER PUBLICATIONS

Lei Li, Resource Allocation and Task Offloading for Heterogeneous Real-Time Tasks With Uncertain Duration Time in a Fog Queueing System. (Year: 2015).*

(Continued)

*Primary Examiner* — Lechi Truong

(74) *Attorney, Agent, or Firm* — CHIP LAW GROUP

(57)　　　ABSTRACT

A computer-implemented method for labeling and managing cloud computing resources includes receiving one or more computing jobs in a job queue and obtaining resource requirements for a first one of the one or more computing jobs. Nodes are placed into a cluster for the resource requirements from one or more cloud providers and the nodes are labelled to correspond to the first one of the one or more computing jobs. The first one of the one or more computing jobs from the job queue and is executed after the labelled aggregated resources are ready.

18 Claims, 3 Drawing Sheets

(56) References Cited

U.S. PATENT DOCUMENTS

| | | | |
|---|---|---|---|
| 2012/0233623 A1* | 9/2012 | van Riel | G06F 9/4881 |
| | | | 718/103 |
| 2018/0067919 A1* | 3/2018 | Ning | G06F 3/0236 |
| 2021/0004163 A1* | 1/2021 | Xu | G06F 9/4881 |
| 2021/0019179 A1* | 1/2021 | Yadav | G06F 9/5038 |
| 2021/0058934 A1* | 2/2021 | Jiang | H04W 72/30 |
| 2021/0081217 A1* | 3/2021 | Xiao | G06F 8/65 |
| 2021/0263667 A1 | 8/2021 | Whitlock | |
| 2021/0271521 A1 | 9/2021 | Kang | |
| 2022/0100573 A1* | 3/2022 | Allen | G06F 9/5038 |
| 2022/0113993 A1* | 4/2022 | Vogt | G06F 9/451 |
| 2022/0138168 A1* | 5/2022 | Veselova | G06F 16/24532 |
| | | | 707/692 |
| 2022/0329651 A1 | 10/2022 | Kim | |
| 2023/0037783 A1* | 2/2023 | Huang | G06F 9/4887 |
| 2023/0273830 A1* | 8/2023 | Shi | G06F 9/5044 |
| 2023/0305905 A1* | 9/2023 | Chen | G06F 9/5038 |
| 2024/0069964 A1* | 2/2024 | Chatterjee | G06F 9/4881 |
| 2024/0069998 A1* | 2/2024 | Chatterjee | G06F 9/5027 |
| 2024/0403143 A1* | 12/2024 | Malvankar | G06F 9/5022 |
| 2025/0238261 A1* | 7/2025 | Tu | G06F 9/4881 |

OTHER PUBLICATIONS

Masoud Mansoury, FairMatch: A Graph-based Approach for Improving Aggregate Diversity in Recommender Systems. (Year: 2020).*

Caballer, M. et al., "Deployment of Elastic Virtual Hybrid Clusters Across Cloud Sites", Journal of Grid Computing 19, No. 1, 2021, 33 pages.

Karpenter with AWS Node Termination Handler, downloaded Mar. 22, 2023 from https://dev.to/aws-builders/karpenter-with-aws-node-termination-handler-149d, 6 pgs.

IBM Spectrum LSF Resource Connector Overview, downloaded Mar. 22, 2023 from ibm.com/docs/en/spectrum-lsf/10.1.0?topic=connector-lsf-resource-connector-overview, 4 pgs.

* cited by examiner

300

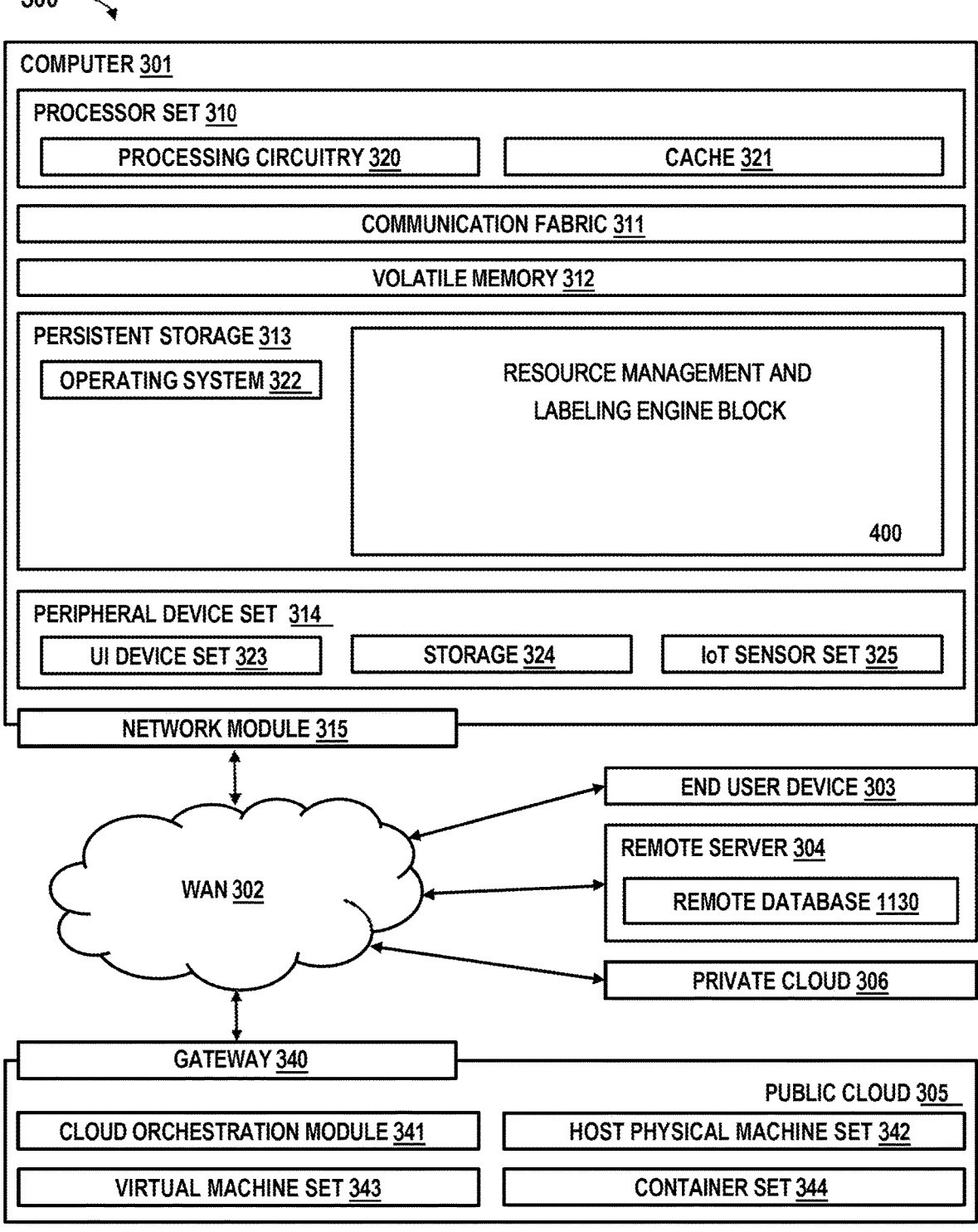

COMPUTER 301

PROCESSOR SET 310

PROCESSING CIRCUITRY 320        CACHE 321

COMMUNICATION FABRIC 311

VOLATILE MEMORY 312

PERSISTENT STORAGE 313

OPERATING SYSTEM 322

RESOURCE MANAGEMENT AND
LABELING ENGINE BLOCK

400

PERIPHERAL DEVICE SET 314

UI DEVICE SET 323     STORAGE 324     IoT SENSOR SET 325

NETWORK MODULE 315

WAN 302

END USER DEVICE 303

REMOTE SERVER 304

REMOTE DATABASE 1130

PRIVATE CLOUD 306

GATEWAY 340

PUBLIC CLOUD 305

CLOUD ORCHESTRATION MODULE 341     HOST PHYSICAL MACHINE SET 342

VIRTUAL MACHINE SET 343     CONTAINER SET 344

FIG. 3

SYSTEM AND METHOD TO DYNAMICALLY ADD NODES TO A CONTAINER MANAGEMENT SYSTEM CLUSTER FOR AI WORKLOADS

BACKGROUND

Technical Field

The present disclosure generally relates to research management, and more particularly, to a computer-implemented method, a computer system, and a computer program product for dynamically adding nodes to a container management system, such as OpenShift, cluster for workloads, especially artificial intelligence (AI) workloads.

Description of the Related Art

Many cloud bursting techniques exists that burst workloads to clouds if on-premise resources are not available in the existing cluster. Container management system, such as OpenShift, batch high performance computing (HPC) service involves a mechanism to scale the existing infrastructure based on aggregated resource requirements of queued jobs. Jobs could be multiple pods or processes that involve heterogeneous resource requirements from multiple clouds (e.g., cloud providers), for example. For instance, the user can request a P3 instance from one cloud computing platform, such as Amazon® Web Services (AWS), and/or a tensor processing unit (TPU) instance from another cloud computing platform, such as Google® Cloud Platform (GCP). Jobs often involve multiple aggregated resources to be available before starting job execution. The scheduler also needs help in scheduling desired processes or pods on newly added nodes.

SUMMARY

In one embodiment, a system and method are provided that can match user resource requirements with an available configuration like machine sets in the cluster to add aggregated resources to the cluster so that users can start the entire job with a guarantee.

The above method can be performed on non-transitory computer readable storage medium tangibly embodying a computer readable program code having computer readable instructions that, when executed, causes a computer device to manage and label cloud resources for pending jobs.

In one embodiment, a computer-implemented method for labeling and managing cloud computing resources includes receiving one or more computing jobs in a job queue and obtaining resource requirements for a first one of the one or more computing jobs. Nodes can be placed into a cluster for the resource requirements from one or more cloud providers and the nodes can be labelled to correspond to the first one of the one or more computing jobs. The first one of the one or more computing jobs from the job queue and can be executed after the labelled aggregated resources are ready.

In another embodiment, a computer-implemented method for labeling and managing cloud computing resources includes receiving multiple computing jobs into a job queue and obtaining resource requirements for each of the multiple computing jobs. Nodes can be placed, into a cluster, for the resource requirements for a first one of the multiple computing jobs from one or more cloud providers. The placed nodes can be labeled to correspond to the first one of the multiple computing jobs, which can then be removed from the job queue. The first one of the multiple computing jobs can be initiated after labelled resources are entirely aggregated for the first one of the multiple computing jobs. The computing job status of the initiated first one of the multiple computing jobs can be monitored, and, once the first one of the multiple computing jobs is completed, it can be determined if any the placed nodes used by the first one of the multiple computing jobs is usable in any other computing jobs of the multiple jobs remaining in the job queue. If there are nodes that can be used by any other computing jobs, such nodes can be relabeled to correspond to the any other computing jobs that require resources used by the first one.

By virtue of the concepts discussed herein, systems and methods are provided for managing and labeling cloud resources. As discussed in greater detail below, such a system and method can optimize cloud resources and reduce computational overhead/complexity and costs by monitoring queued job requirements and matching nodes of completed jobs with those allocated for queued jobs.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 3 is a functional block diagram illustration of a computer hardware platform that can be used to implement the method for labeling and managing cloud computing resources, consistent with an illustrative embodiment.

DETAILED DESCRIPTION

Figure 1:
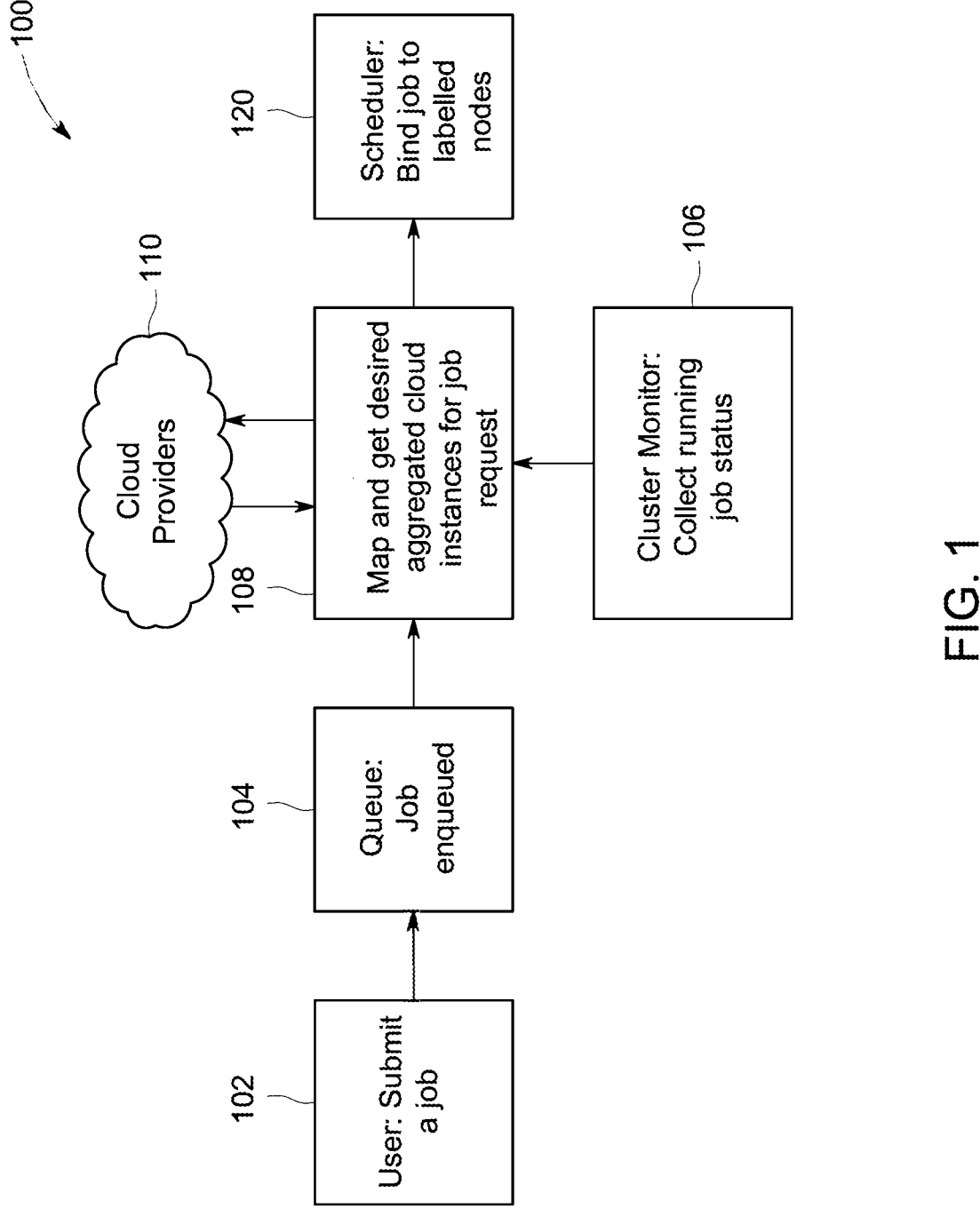
FIG. 1 shows an architecture of a system for preforming a method of managing cloud computing resources, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Broadly, aspects of the present disclosure provide systems and methods for matching user resource requirements with an available configuration, such as machine sets in a cloud cluster, to add aggregated resources to the cloud cluster so that users can start an entire job with a guarantee that the job will execute.

As described in greater detail below, the systems and methods of the present disclosure allow a user to submit a configuration file in a human-readable data-serialization language, such as yaml, to run batch AI jobs that involve multiple instances from different cloud providers. Typically, these workloads have all-or-none requirements for running computation. In other words, the jobs typically cannot execute unless all the resource requirements are available.

The batch jobs can be queued when job analysis confirms that the aggregated resources are not available in the cluster. The system and methods of the present disclosure can manage resources tied to each queued job, where, when the job is an event pending/queued job, the systems and methods can split user resource requests to various instance types available in a target cloud cluster, acquire and add different machines to the cluster that satisfy the resource requirement, and inform the queuing system about ready resources after adding labels to the newly acquired nodes for the target job. The labeling of the newly acquired nodes can enable a scheduler to place pods or jobs of only desired pods or jobs on the newly added nodes. For example, if the system is gathering cloud resources for a given queued job and acquired a first set of nodes from one cloud provider, by labeling these nodes, these nodes are marked for use by the particular queued job and cannot be consumed by a different queued job while the system gathers the remainder of the required cloud resources. These nodes may be, for example, computing resources, such as TPU instances, P3 instances, graphics processing unit (GPU) instances or the like.

Once the event is complete, the systems and methods of the present disclosure can delete all the associated nodes with the job. However, if other users request the same instance types, then, instead of deleting these associated nodes, the queued computing jobs can be scheduled on the already acquired nodes after dynamically changing labels set by the previous job to the next job.

Aspects of the present disclosure can provide, in illustrative embodiments, various features and benefits. First, the systems and methods can provide guaranteed aggregated resource availability prior to job execution from multiple clouds. Further, the systems and methods can provide the ability to schedule pods on aggregated acquired resources. The system and methods can also provide the ability to help the scheduler make scheduling decisions for newly acquired resources for a job. The system and methods can further provide the ability to re-use aggregated resources after job completion depending on a queued job requirements. Finally, the system and methods can remove resources when a job is complete and no queued jobs require the same resource. These features can reduce wait time for cloud resources for queued jobs, prevent other resources from using labeled resources for a given job, and reduce computing resource complexity/overhead and costs of cloud resources by removing such resources once a job is complete.

Although the operational/functional descriptions described herein may be understandable by the human mind, they are not abstract ideas of the operations/functions divorced from computational implementation operations/functions. Rather, the operations/functions represent a specification for an appropriately configured computing device. As discussed in detail below, the operational/functional language is to be read in its proper technological context, i.e., as concrete specifications for physical implementations.

Accordingly, one or more of the methodologies discussed herein may provide job scheduling and cloud computing resource management. This may have the technical effect of reducing wait time to acquire resources as well as cost for cloud computing resources.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

Referring now to FIG. 1, a computing system 100 can include a user input block 102 where a user can submit a job. At a job queue 104, the job can be enqueued in a job queue. The system can include a resource management block 108 that retrieve nodes from one or more cloud providers 110. In some embodiments, the system can request heterogenous resources from multiple ones of one or more cloud providers. For example, if a given job at the job queue 104 involve resources from two different cloud providers, the resource management block 108 can obtain a first set of nodes from a first cloud provider and label the first set of nodes with an indicator corresponding to given job. Next, the resource management block 108 can obtain the second set of nodes from a second cloud provider and label the second set of nodes with the indicator corresponding to the given job. Once all the resources are obtained, the system 100 can include a scheduler block 120 for scheduling and executing the given job with the obtained, labeled resources.

The system 100 can further include a cluster monitor block 106 that can monitor the status of jobs running in the system 100. When, for example, the given job discussed above is complete, the cluster monitor block 106 can let the resource management block 108 know that the resources used by the given job are no longer in use. The resource management block 108 can check the job queue block 104 to determine if any queued jobs need any of the first set of nodes or the second set of nodes that were previously used by the now completed given job. If not, the resource management block 108 can release the resource to the cloud provider 110. If any of the nodes may be needed by a queued job, the resource management block can re-use the nodes by dynamically replacing the old labels (which corresponded to the completed given job) with new labels that correspond to the new job that uses the nodes.

Certain nodes may have a wait time to gain access. Once access is obtained, the resource management block 108 can label these nodes for the queued job and, once the computing job is complete, the resource management block 108 can check to see if a queued job requires this resource, thus saving the wait time for such a node for the next job. By re-labeling this node for the next job, the resource management block 108 ensures availability of this resource by the new job once all the required resources for execution are obtained. Thus, the resource management block 108 can save job computing process time by reducing the lead time that may be involved to gain access to a given node.

Further, the resource management block 108 can, once a computing job is complete, determine if any queued job needs the newly released node. If not, the resource management block 108 can release the node back to the cloud provider 110. Such nodes may involve significant computational overhead are such costs are often based on the time the node is allocated to a user. Thus, the resource management block 108 can save costs by automatically releasing resources back to cloud providers 110 once a job is finished with the node.

Example Process

Figure 2:
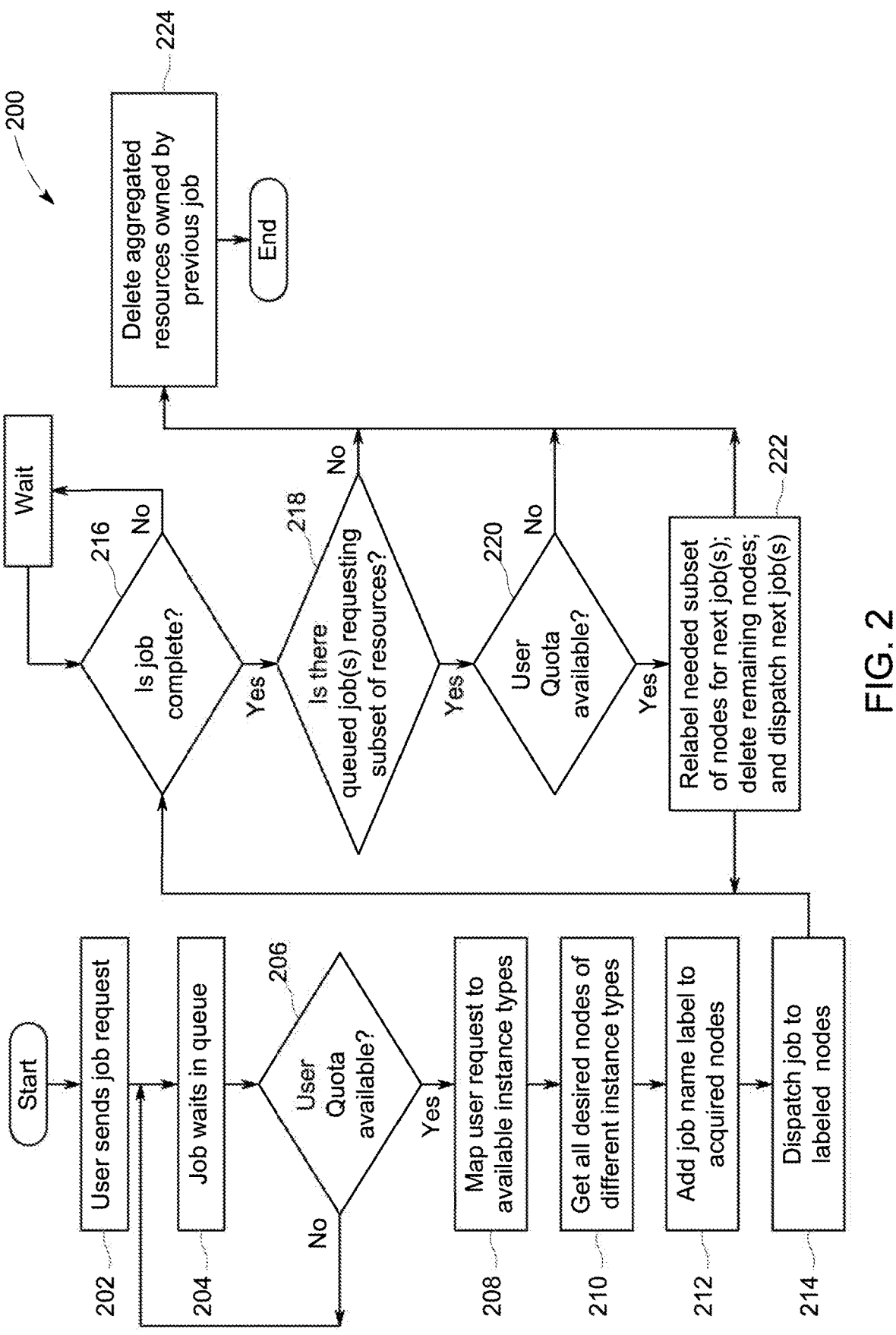
FIG. 2 shows a flow chart describing a method of managing cloud computing resources, consistent with an illustrative embodiment.

It may be helpful now to consider a high-level discussion of an example process. To that end, FIG. 2 presents an illustrative process 200 related to the method for managing cloud computing resources for queued jobs. Process 200 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Referring to FIGS. 1 and 2, a process 200 for managing cloud resources starts at block 202 where a user can send a job request to the job queue 104. The job can wait in the job queue 104 at block 204 while the system determined if the user has available quota at block 206. At block 208, the process 200 can map user requests to available instance types, such as nodes from one or more cloud providers 110. At block 210, as the desired nodes, typically of different instance types, and be placed into a cluster and a job name label, or other similar association label, can be added to the acquired nodes. At block 214, the jobs can be dispatched to the labeled nodes for execution ones all the required nodes are aggregated and labelled.

Once the job is complete, as determined at block 216, the system can check to see if any new jobs in the job queue 104 require all or some of the resources released when the job running was determined as being complete at block 216. The process 200 can check the user quota for the new job at block 220 and, if user quota is available, then the nodes released from the original running job (which was determined as being complete at block 216) that can be used in the new job can be relabeled at block 222. Any nodes from the original jobs that are not needed by a job in the job queue 104 can be deleted at block 224. The new job can revert back to block 216, to check for job completion to continue the cycle.

Example Computing Platform

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 3, computing environment 300 includes an example of an environment for the execution of at least some of the computer code involved in performing the inventive methods, including a resource labeling and management engine block 400. In addition to block 400, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and block 400, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

COMPUTER 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

PROCESSOR SET 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in block 400 in persistent storage 313.

COMMUNICATION FABRIC 311 is the signal conduction path that allows the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 312 is any type of volatile memory now known or to be developed in the future. Examples include dynamic type random access memory (RAM) or static type RAM. Typically, volatile memory 312 is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

PERSISTENT STORAGE 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface-type operating systems that employ a kernel. The code included in block 400 typically includes at least some of the computer code involved in performing the inventive methods.

PERIPHERAL DEVICE SET 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

NETWORK MODULE 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

REMOTE SERVER 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

PUBLIC CLOUD 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for labeling and managing cloud computing resources, the computer-implemented method comprising:

receiving a plurality of computing jobs in a job queue;

obtaining resource requirements for a first computing job of the plurality of computing jobs;

placing nodes from one or more cloud providers into a cluster for the resource requirements;

labeling the placed nodes to correspond to the first computing job;

removing, based on the labeling of the placed nodes, the first computing job from the job queue;

aggregating the labeled nodes for the first computing job;

initiating the first computing job after the labeled nodes are aggregated for the first computing job and after the removing of the first computing job from the job queue;

monitoring, with a cluster monitor, a computing job status of the initiated first computing job; and after the cluster monitor provides an indication that the first computing job is complete, determining whether one or more nodes of the placed nodes used by the first computing job are usable in a second computing job of remaining computing jobs of the plurality of computing jobs, wherein the remaining computing jobs are remaining in the job queue after the removing of the first computing job from the job queue;

relabeling the one or more labeled nodes to correspond to the second computing job that requires resources used by the first computing job.

2. The computer-implemented method of claim 1, wherein the one or more cloud providers are multiple cloud providers, and the nodes are obtained from the multiple cloud providers.

3. The computer-implemented method of claim 1, further comprising requesting heterogenous resources from the one or more cloud providers.

4. The computer-implemented method of claim 1, further comprising relabeling the one or more nodes of the placed nodes to correspond to the second computing job when the relabeled one or more nodes of the placed nodes are usable in the second computing job.

5. The computer-implemented method of claim 1, further comprising deleting nodes from the placed nodes of the cluster, that are not required for the plurality of computing jobs in the job queue.

6. The computer-implemented method of claim 1, further comprising relabeling multiple nodes of the placed nodes to correspond to multiple computing jobs of the plurality of computing jobs when the relabeled multiple nodes are usable in the multiple computing jobs.

7. The computer-implemented method of claim 1, further comprising:

adding additional nodes to the cluster to permit the second computing job to have all resources required for execution; and labelling the additional nodes to correspond to the second computing job.

8. A computer-implemented method for labeling and managing cloud computing resources, the computer-implemented method comprising:

receiving multiple computing jobs in a job queue;

obtaining resource requirements for each computing job of the multiple computing jobs;

placing nodes from one or more cloud providers into a cluster for the resource requirements for a first computing job of the multiple computing jobs;

labeling the placed nodes to correspond to the first computing job;

removing, based on the labeling of the placed nodes, the first computing job from the job queue;

aggregating the labeled nodes for the first computing job;

initiating the first computing job after the labeled nodes are aggregated for the first computing job and after the removing of the first computing job from the job queue;

monitoring a computing job status of the initiated first computing job;

determining, based on the monitoring of the computing job status, that the first computing job is completed;

determining, based on the determining that the first computing job is completed, that one or more labeled nodes among the labeled nodes used by the first computing job are usable in a second computing job of remaining computing jobs of the multiple computing jobs, wherein the remaining computing jobs are remaining in the job queue after the removing of the first computing job from the job queue; and relabeling the one or more labeled nodes to correspond to the second computing job that requires resources used by the first computing job.

9. The computer-implemented method of claim 8, further comprising deleting, from the cluster, a portion of the placed nodes that are not required for the remaining computing jobs.

10. The computer-implemented method of claim 8, wherein the one or more cloud providers are multiple cloud providers, and the nodes are obtained from the multiple cloud providers.

11. The computer-implemented method of claim 8, further comprising requesting heterogenous resources from the one or more cloud providers.

12. The computer-implemented method of claim 8, further comprising:

adding additional nodes to the cluster to permit one or more computing jobs of the remaining computing jobs to have all resources required for execution; and labelling the additional nodes to correspond to each computing job of the one or more computing jobs of the remaining computing jobs.

13. A non-transitory computer readable storage medium tangibly embodying a computer readable program code having computer readable instructions that, when executed, causes a computer device to carry out a method of computing resource labeling and management, the method comprising:

receiving a plurality of computing jobs in a job queue;

obtaining resource requirements for a first computing job of the plurality of computing jobs;

placing nodes from one or more cloud providers into a cluster for the resource requirements;

labeling the placed nodes to correspond to the first computing job;

removing, based on the labeling of the placed nodes, the first computing job from the job queue;

aggregating the labeled nodes for the first computing job;

initiating the first computing job after the labeled nodes are aggregated for the first computing job and after the removing of the first computing job from the job queue;

monitoring, with a cluster monitor, a computing job status of the initiated first computing job; and after the cluster monitor provides an indication that the first computing job is complete, determining whether one or more nodes of the placed nodes used by the first computing job are usable in a second computing job of remaining computing jobs of the plurality of computing jobs, wherein the remaining computing jobs are remaining in the job queue after the removing of the first computing job from the job queue;

relabeling the one or more labeled nodes to correspond to the second computing job that requires resources used by the first computing job.

14. The non-transitory computer readable storage medium of claim 13, the method further comprising obtaining the nodes from the one or more cloud providers.

15. The non-transitory computer readable storage medium of claim 13, the method further comprising requesting heterogenous resources from the one or more cloud providers.

16. The non-transitory computer readable storage medium of claim 13, the method further comprising: monitoring, with a cluster monitor, a computing job status of the initiated first computing job; determining, after the cluster monitor provides an indication that the first computing job is complete, whether one or more nodes of the placed nodes used by the first computing job are usable in a second computing job of remaining computing jobs of the plurality of computing jobs, wherein the remaining computing jobs are remaining in the job queue after the removing of the first computing job from the job queue; and relabeling the one or more nodes of the placed nodes to correspond to the second computing job when the relabeled one or more nodes of the placed nodes are usable in the second computing job.

17. The non-transitory computer readable storage medium of claim 13, the method further comprising deleting nodes from the placed nodes of the cluster, that are not required for the remaining computing jobs in the job queue.

18. The non-transitory computer readable storage medium of claim 13, the method further comprising:

adding additional nodes to the cluster to permit the second computing job of the plurality of computing jobs to have all resources required for execution; and labelling the additional nodes to correspond to the second computing job.

* * * * *